(12) United States Patent
Huang et al.

(10) Patent No.: US 6,498,879 B1
(45) Date of Patent: Dec. 24, 2002

(54) POLARIZATION-INDEPENDENT, ENVIRONMENTALLY STABLE OPTICAL FIBER NARROW BAND MULTI-WINDOW WAVELENGTH DIVISION MULTIPLEXER BASED ON BICONICAL TAPERED FUSION COUPLER TECHNOLOGY

(75) Inventors: Chi-hung Huang; Robert I. Huang; Joseph C. Chon, all of Fremont, CA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 0 days.

(21) Appl. No.: 09/282,522

(22) Filed: Mar. 31, 1999

(51) Int. Cl.[7] ................................. G02B 6/26
(52) U.S. Cl. ............................. 385/43; 385/94; 385/39
(58) Field of Search ................... 385/43, 94, 37, 385/48, 79, 51, 31, 11, 34, 15, 24, 39, 99

(56) References Cited

U.S. PATENT DOCUMENTS

| | | | | |
|---|---|---|---|---|
| 5,217,517 | A | 6/1993 | Rossberg | 65/4.21 |
| 5,408,555 | A | 4/1995 | Fielding et al. | 385/43 |
| 5,809,190 | A | 9/1998 | Chen | 385/43 |
| 5,987,201 | A | * 11/1999 | Chen | 383/43 |
| 6,081,641 | A | * 6/2000 | Chen | 385/43 |
| 6,134,362 | A | * 10/2000 | Au-Yeung et al. | 385/43 |
| 6,324,322 | B1 | * 11/2001 | Luo et al. | 385/43 |
| 6,341,186 | B1 | * 1/2002 | Singh et al. | 385/27 |

OTHER PUBLICATIONS

Wilkinson, I. and Rowe, C., "Close–Spaced Fused Fibre Wavelength Division Mulitplexers With Very Low Polarisation Sensitivity" (1990).

Yamasaki et al., "Ultralow PDL WDM fiber couplers for WDM transmission systems" (1998).

* cited by examiner

Primary Examiner—Frank G. Font
Assistant Examiner—Layla Lauchman
(74) Attorney, Agent, or Firm—James S. Hsue; Skjerven Morrill LLP (57) ABSTRACT

A structure and method are provided to improve stability of a multi-window dense wavelength division multiplexers and to provide polarization-independent multi-window dense wavelength division multiplexers. In one embodiment, the coupler region of a multi-window wavelength division multiplexer (MWDM) is hermetically sealed in a protective casing to prevent moisture from affecting the passband wavelength drifting in the coupler. In one embodiment, the coupler is elastically twisted at the fused fiber portion to reach polarization cancellation. In another embodiment, the coupling region of the coupler is exposed to UV-radiation for passband wavelength adjustment. In yet another embodiment, a passive thermal compensation technique is used to minimize the thermal effect on the passband wavelengths for dense WDM applications. In a further embodiment, the coupler is mounted on the substrate using soft adhesives in conjunction with rigid adhesives, to improve mechanical shock protection.

53 Claims, 7 Drawing Sheets

POLARIZATION-INDEPENDENT, ENVIRONMENTALLY STABLE OPTICAL FIBER NARROW BAND MULTI-WINDOW WAVELENGTH DIVISION MULTIPLEXER BASED ON BICONICAL TAPERED FUSION COUPLER TECHNOLOGY

FIELD OF THE INVENTION

The present invention relates to fused-fiber wavelength division multiplexers (WDM) and, in particular, to a multi-window dense WDM structure.

BACKGROUND OF THE INVENTION

With existing fiber optic networks, there is often the need to increase information transmission capacity. However, both physical and economic constraints can limit the feasibility of increasing transmission capacity. For example, installing additional fiber optic cable to support additional signal channels can be cost prohibitive, and electronic system components may impose physical limitations on the speed of information that can be transmitted. The use of wavelength division multiplexers (WDMs) provides a simple and economical way to increase the transmission capacity of fiber optic communication systems by allowing multiple wavelengths to be transmitted and received over a single optical fiber through signal wavelength multiplexing and demultiplexing. In addition, WDMs can be used in fiber optic communication systems for other purposes, such as dispersion compensation, noise reduction, and gain flatting, i.e., maintaining a uniform gain within the usable bandwidth for erbium doped amplifiers.

WDMs can be manufactured using, for example, biconical tapered fusion (BTF) technology. Typically, two optical fibers are fused together along an interior portion to form a fused-fiber coupler, so that light of two wavelengths (i.e., 1310 nm and 1550 nm) entering the input terminals of the first and second fibers, respectively, are multiplexed onto a single fiber. The coupling ratios for the two channels (the signals at 1310 nm and 1550 nm) exhibit complementary sinusoidal behavior for amplitude as a function of frequency within the passband of the WDM, with each channel having one or more peaks (or windows) within the passband. Information carried by the two signals along the single fiber is then demultiplexed at the WDM outputs. Light at 1550 nm is particularly desirable because minimal absorption is exhibited by optical fibers around this wavelength. Commercially available fused-fiber WDMs typically also couple and decouple light at 1550 nm and 980 nm and at 1550 nm and 1480 nm.

Figure 1:
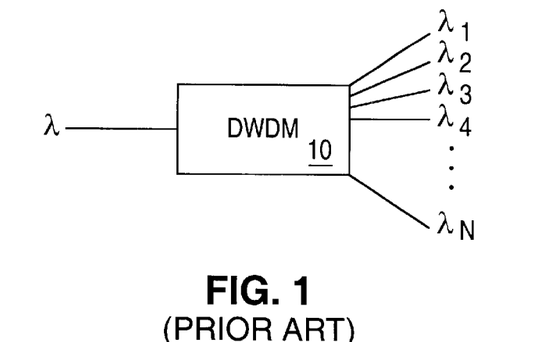
FIG. 1 illustrates a dense wavelength division multiplexer (DWDM)

The principles of WDM can be extended to further increase data transmission capability by coupling additional discrete wavelengths or channels onto a single fiber using devices known as dense WDMs (DWDMs). DWDM is a one-to-N device, as shown in FIG. 1. Fused-fiber DWDM 10 may couple N discrete communication channels $\lambda_1$ through $\lambda_N$ onto a single optic fiber $\lambda$. For example, 8, 16, or even 32 discrete communication channels may be coupled onto a single optic fiber. However, because the usable bandwidth of the light is limited, increasing the number of wavelengths necessarily results in smaller channel separation between the discrete wavelengths. In general, smaller channel spacing can be achieved by increasing the length of the fused portion of a fused-fiber DWDM. However, decreasing channel spacing presents different types of problems, such as increased sensitivity to temperature fluctuations.

Figure 2:
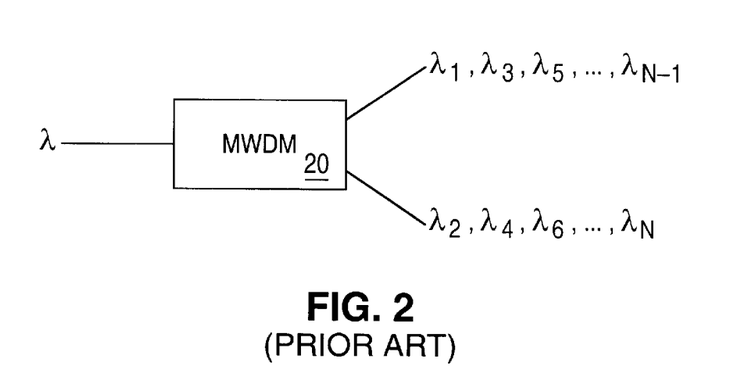
FIG. 2 illustrates a multi-window wavelength division multiplexer (MWDM)

A DWDM may comprise several or a plurality of multi-window WDMs (MWDMs). An MWDM is a one-to-two device, as shown in FIG. 2. Light with wavelength $\lambda$ enters MWDM 20 which decouples wavelength $\lambda$ into two groups, one consisting wavelengths $\lambda_1$ to $\lambda_{N-1}$ and one group consisting wavelengths $\lambda_2$ to $\lambda_N$, where N is an even number.

MWDMs have two or more peaks of amplitude as a function of frequency (or operational windows) for each channel within a passband. MWDMs can also be made using BTF technology by putting two optical fibers in parallel, fusing the center portion together, and pulling the fibers until a desired multi-window transmission spectrum appears at a monitored fiber output terminal.

Fused-fiber couplers generally exhibit polarization-dependent loss (PDL). This PDL is induced by the difference of two polarization-dependent coupling coefficients in the tapered regions of the coupler, where two optical fibers are fused together and elongated for optical power coupling. The cross-sectional shape of the tapered section is elliptical or dumbbell-shaped which produces birefringence along the tapered section.

Figure 3:
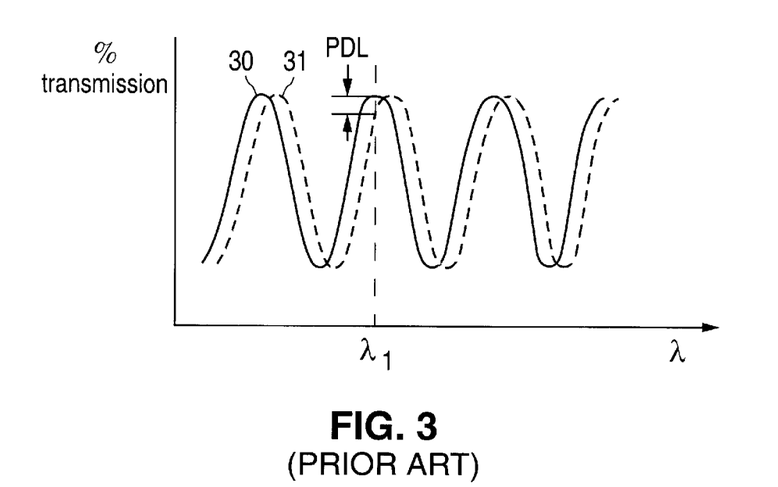
FIG. 3 illustrates polarization dependent loss (PDL) between two different polarizations.

FIG. 3 illustrates spectral transmitted ratios for two polarizations, e.g., x-polarization and y-polarization. Curve 30, representing, e.g., x-polarization, is shifted from curve 31, representing, e.g., y-polarization, in terms of wavelength. The difference of transmitted power for the two modes at the same wavelength $\lambda_1$ is defined as the PDL between x-polarization curve 30 and y-polarization curve 31. Curve 30 is shifted from curve 31 because the two principle polarizations x and y have different polarization coefficients. Hence, a light propagating along the x-polarization sees a different geometrical structure than a light propagating along the y-polarization, thus, a difference in the coupling strength. PDL is undesirable because it limits the system performance, e.g., less passbands and larger signal fluctuation.

One way to reduce the polarization sensitivity of BTF MWDM is to use longer pull length to reach optimum phase match condition between the propagation mode of light. Such a long-tapered-fusing technology is discussed in commonly-owned U.S. Pat. No. 5,809,190, entitled "Apparatus and Method of Making a Fused Dense Wavelength-Division Multiplexer", which is incorporated by reference herein in its entirety. However, methods of quenching the polarization sensitivity generally lead to an increased temperature sensitivity. In addition, this method requires longer pull length, which reduces the diameter of the tapered section and increases the chance of breakage.

Another method, a paper by I. J. Wilkinson and C. J. Rowe entitled "Close-Spaced Fused Fibre Wavelength Division Multiplexers with Very Low Polarisation Sensitivity" (the Wilkinson paper), Electronics Letters, vol. 26, No. 6, pp. 382–384, Mar. 15, 1990, describes how the polarization sensitivity (birefringence) of a wavelength multiplexing fused fiber 2×2 coupler can be substantially nulled-out by elasticity twisting the coupler after its fabrication. However, this paper fails to provide precise wavelength spacing control during the device fabrication, which is critical to a MWDM. The precise control of channel spacing is critical because of the cumulative effect of channel spacing offset across the operating window. For example, if the first wavelength in an operating window, having n wavelengths, is set at a desired value precisely, an inaccuracy of $d\lambda$ in channel spacing will accumulate across the entire operating window, resulting in a significant offset of $(n-1) \times d\lambda$ for the last wavelength in the operating window. In addition, this paper also fails to provide peak position control during the device fabrication.

U.S. Pat. No. 5,408,555 (the '555 patent) entitled "Polarization Insensitive Wavelength Multiplexing 2×2 Fibre Couplers," by Fielding et al., added an additional step of requiring continuous monitoring of the twisting process to enable termination of the manufacturing process at a particular moment, i.e., providing a relatively high level of precision in the spectral positioning of the minimum and maximum power transfer wavelengths for one of the principal planes of polarization of the coupler. However, the method described in the '555 patent is complicated and time consuming because a polarized light source and a polarization controller are required. In addition, this method requires numerous torching steps during the polarization adjustment process, thereby increasing the insertion loss of the device. Furthermore, due to the use of a single-wavelength light source, the actual channel spacing and the polarization states across the entire desired wavelength range of the MWDM are not measurable. Therefore, this method is only suitable for fabricating WDMs, not MWDMs.

A problem associated with the long-tapered couplers is that when the fiber is pulled longer and longer and the passband spacing becomes narrower, moisture on the surface of the fibers causes the passband wavelength to drift. The light wave is generally confined to the core region of an optic fiber which has a round core region, before it is stretched. However, when two fibers are fused and stretched, the core region of the optic fibers at the fused region becomes smaller. The light passing through the optic fibers now spreads to the entire cladding region which is in direct contact with air, rather than being confined to the core region of the optic fibers. Moisture, including organic or inorganic vapor, on the surfaces of the optic fibers, causes the boundary condition to change, which in turn causes the wavelength peak to drift, making the system unreliable. The wavelength drift caused by moisture is especially critical in a DWDM because DWDM has very narrow channel spacings. Therefore, a small amount of drift in the wavelength can cause the system to be unstable and unreliable.

An additional problem associated with a fused coupler WDM with narrow channel spacing is sensitivity to temperature fluctuations. As temperature increases in the fused-fiber WDM, the refractive index of the fused-fiber portion increases due to the refractive index dependence on the temperature of the fused silica, which is approximately $6 \times 10_{-6}/° C$. This causes a longer optical path inside the coupling region of the WDM. These temperature-induced shifts normally do not adversely affect conventional wide-band WDMs, which typically have channel spacings of 50 nm or more. However, with DWDMs, typically having channel spacings of 1 nm or less, such wavelength shifts can pose significant problems with transmission performance.

One way to produce a fused coupler is to use a fusion machine to heat and stretch the fibers. A conventional fusion machine comprises two identical chucks, both sitting on slides. The chucks hold the optical fibers to be coupled while a torch heats the fibers held between the chucks. The fibers are then stretched and fused together. The output optical power or spectrum is monitored during the stretching and fusing process. The stretching and fusing process is terminated when a predetermined output is obtained. The conventional fusion machine is incapable of twisting the fused fibers.

Accordingly, a structure and method are desired which provide a reliable polarization-independent environmentally stable optical fiber narrow band multi-window wavelength division multiplexer based on BTF coupler technology.

SUMMARY OF THE INVENTION

The present invention provides a multi-window dense wavelength division multiplexer (MWDM) which improves stability and performance in MWDMs by utilizing biconical tapered fusion (BTF) coupler technology, elastic twisting, a hermetic seal, passive temperature compensation for the couplers, coupler mounting scheme, and ultraviolet (UV) radiation exposure of the coupling region of the coupler and a method of making such a MWDM.

In accordance with the present invention, a pair of optic fibers is twisted along the coupling region after the fusion process to obtain a polarization-independent MWDM. The number of turns depends on the length of the fused coupling region and the wavelengths of the incoming light. By utilizing elastic twisting, a wider modulation envelope and more passbands of approximately equal amplitude with precise passband spacing are obtained. In one embodiment, the coupler is hermetically sealed to eliminate the wavelength drifting caused by moisture, allowing a stable MWDM to be produced.

A fusion machine is provided to perform the elastic twisting. The fusion machine comprises a fiber twisting device which includes a latch that locks a first chuck in a stationary position. The first chuck, together with a second chuck holds the fibers in place. The first chuck and the second chuck are positioned on the same plane so that the fibers are held in a horizontal position. The fiber twisting device and the second chuck are on sliders so that the distance between the first and the second chucks may be adjusted. The latch is released and turned so that the first chuck can be turned by turning a thumbwheel, until a predetermined polarization curve is obtained, i.e., by observing the output of a spectrum analyzer.

In one embodiment, the coupler is mounted on a substrate with a larger thermal expansion coefficient than the thermal expansion coefficient of the coupler to adjust the tension of the coupler, thus counteracting the intrinsic thermal drift of the coupler. In another embodiment, the coupler is mounted on the substrate using soft adhesives in conjunction with rigid adhesives, to improve mechanical shock protection.

In one embodiment, the coupling region of the coupler is exposed with UV radiation to change the refraction index of the coupling region, hence changing the passband wavelength of the coupler.

This invention will be more fully understood in light of the following detailed description taken together with the accompanying drawings.

BRIEF DESCRIPTION OF THE DRAWINGS

Use of the same reference numbers in different figures indicates similar or like elements.

DETAILED DESCRIPTION

The present invention provides a multi-window dense wavelength division multiplexer (MWDM) which improves stability and performance in MWDMs by utilizing biconical tapered fusion (BTF) coupler technology, elastic twisting, a hermetic seal, passive temperature compensation for the couplers, coupler mounting scheme, and ultraviolet (UV) radiation exposure of the coupling region of the coupler and a method of making such a MWDM.

Figure 4:
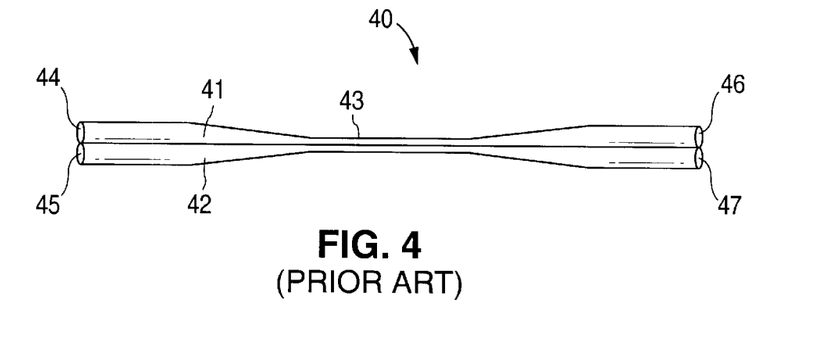
FIG. 4 illustrates a conventional fused-fiber coupler.

Biconical tapered fusion (BTF) technology has been used to fabricate a variety of optical fiber devices, such as couplers, attenuators, filters, and wideband WDMs. A typical fused-fiber coupler 40 is shown in FIG. 4. Fused-fiber coupler 40 can be formed by heating and axially stretching two optic fibers 41 and 42 to form a coupling region 43. Light entering coupler 40 at input terminal 44 or 45, couples onto and travels along fused coupling region 43, and then decouples and exits coupler 40 at output terminals 46 and 47.

Figure 5:
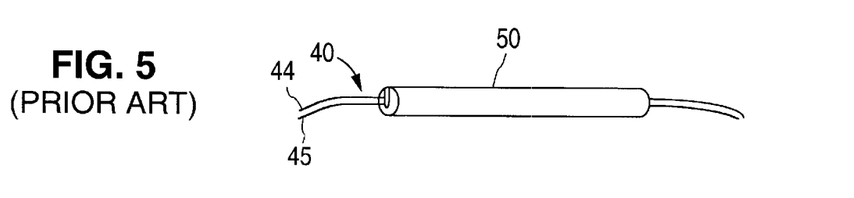
FIG. 5 illustrates the fused-fiber coupler of FIG. 4 mounted in a quartz sleeve.

To provide mechanical protection, as well as thermal stabilization, coupler 40 is typically placed or secured within a quartz sleeve substrate 50, as shown in FIG. 5. Thermal stabilization is achieved because quartz has a thermal expansion coefficient similar to that of the silica fiber. Coupler 40 and quartz sleeve 50 can then be placed inside a sealed package 60, typically metal, to increase mechanical and humidity protection for the fused-fiber coupler, as shown in FIG. 6.

Figures 6, 7A:
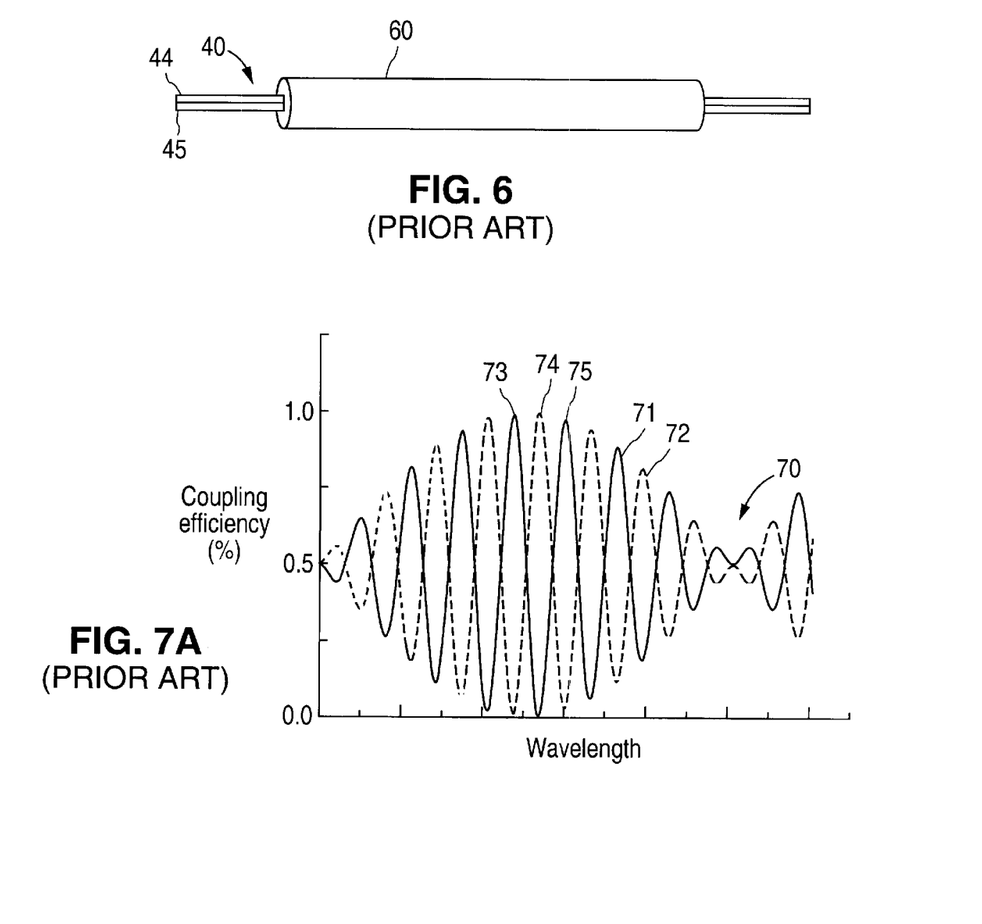
FIG. 6 illustrates the coupler and sleeve of FIG. 5 enclosed in a protective package.
FIG. 7A illustrates a graph of a typical spectrum of the output light from a conventional BTF DWDM.

FIG. 7A illustrates the transmission spectrum from output terminals 46 and 47 when an unpolarized broadband light is applied at input terminal 44. The transmission spectrum consists alternating peaks and nulls. Due to the optical path length difference between the two propagation mode in the coupling region, different constructive and destructive interference occurs at different wavelengths, resulting in the spectrum of FIG. 7A. Solid line 71 represents the amplitude as a function of frequency of the output signal from one transmission channel (e.g., output terminal 46), while dashed line 72 represents the amplitude as a function of frequency for the simultaneous output signal from the other transmission channel (e.g., output terminal 47).

The channel spacing $\Delta\lambda$ of a MWDM, defined as the wavelength separation between the transmission peak wavelengths of two adjacent channels, is shown, for example, by the separation of peaks 73 and 74. The window spacing of the MWDM, which is normally twice the channel spacing, is defined by the wavelength separation between two adjacent transmission peak wavelengths from a channel, as shown, for example, by the separation of peaks 73 and 75. The wavelength separation (or combination) capability of the MWDM depends on the number of windows and the window spacing of the MWDM. The channel spacing of most commonly available commercial fused-fiber WDMs are typically 50 nm or more, i.e., 70 nm for a 1480 nm/1550 nm pair, 240 nm for a 1310 nm/1550 nm pair, and 570 nm for a 980 nm/1550 nm pair.

The transmission curve of FIG. 7A also exhibits a slower modulating envelope resulting from polarization mode interference. Because the fused-fiber in the coupling region is birefringent, i.e., the phase velocity of the light propagating through the coupling region is dependent on the direction of polarization of the light, loss variation due to polarization is maximum in the lowest parts 70 of the modulation envelope and minimum in the highest parts 73 and 74 of the modulation envelope.

Figure 7B:
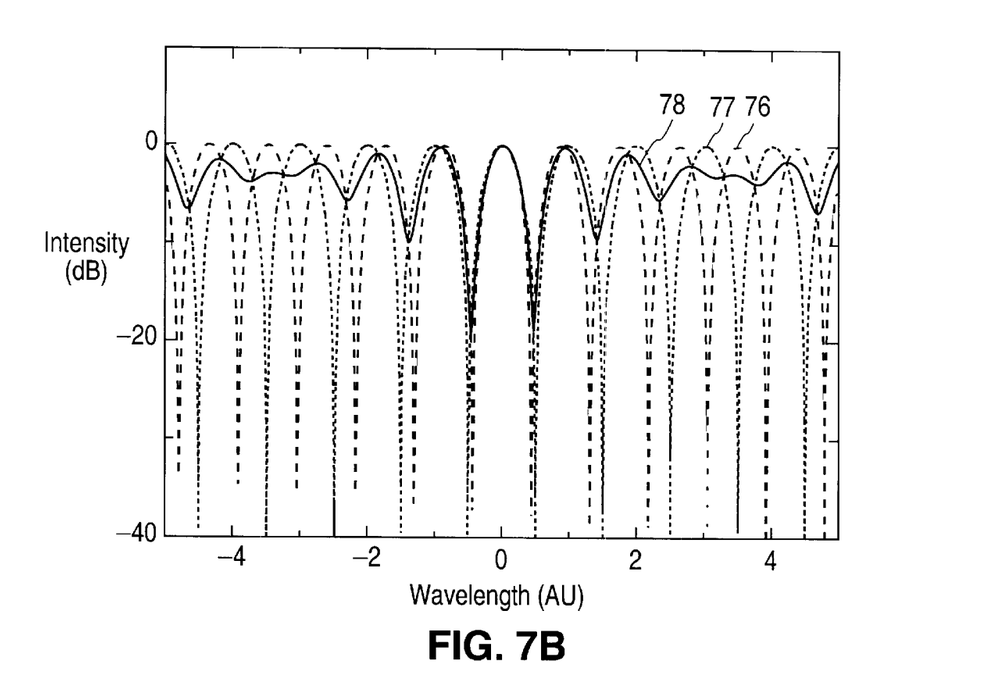
FIG. 7B illustrates the output spectra when a polarized light is applied at an input terminal and the output spectrum when an unpolarized light is applied at the input terminal, all without elastic twisting of the couplers.

FIG. 7B illustrates the output spectra when polarized lights are applied at the input terminal and the output spectrum when an unpolarized light is applied at the input terminal, all without elastic twisting of the couplers. Polarized spectrum 76 (shown in dashed line) shows the actual output spectrum (in logarithmic scale) when an x-polarized light is applied at input terminal 44 or 45. Similarly, polarized spectrum 77 (shown in dotted line) shows the actual output spectrum when a y-polarized light is applied at input terminal 44 or 45. As can be seen from FIG. 7B, both polarized spectra 76 and 77 are periodic and uniform, but have different frequencies due to the birefringence at coupling region 43. Solid line 78 shows the output spectrum when an unpolarized light is applied at input terminal 44 or 45. Solid line 78 is the average of polarized spectra 76 and 77. The modulation envelop width is the beat length of polarized spectra 76 and 77, and the central portion of the modulation envelop provides minimum polarization dependency.

Figure 8:
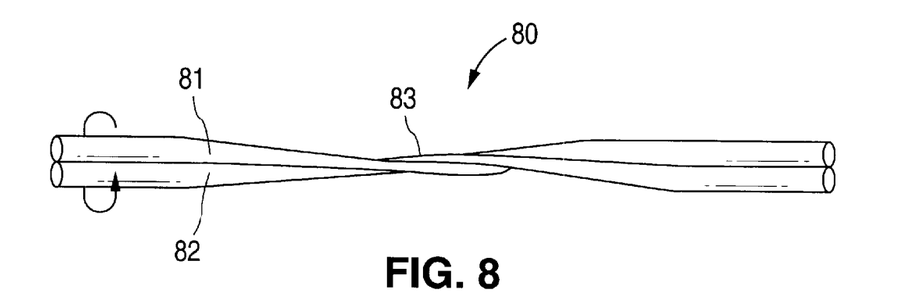
FIG. 8 illustrates a diagram of a DWDM utilizing elastic twisting.

FIG. 8 illustrates a DWDM 80 utilizing elastic twisting to minimize the effects of birefringence. Polarization cancellation is then obtained by twisting the pair of optic fibers 81 and 82 a few turns along coupling region 83 after the fusion process. Polarization cancellation is obtained by twisting the fibers until a desired curve is reached by looking at a spectrum analyzer. Typically, a range of 1 to 10 turns is sufficient to achieve polarization cancellation, depending on the length of the fused coupling region and the wavelengths of the incoming light. By utilizing elastic twisting, a wider modulation envelope and more passbands of approximately equal amplitude (typically 5 or more) are possible, as that shown in FIG. 9.

Figure 9:
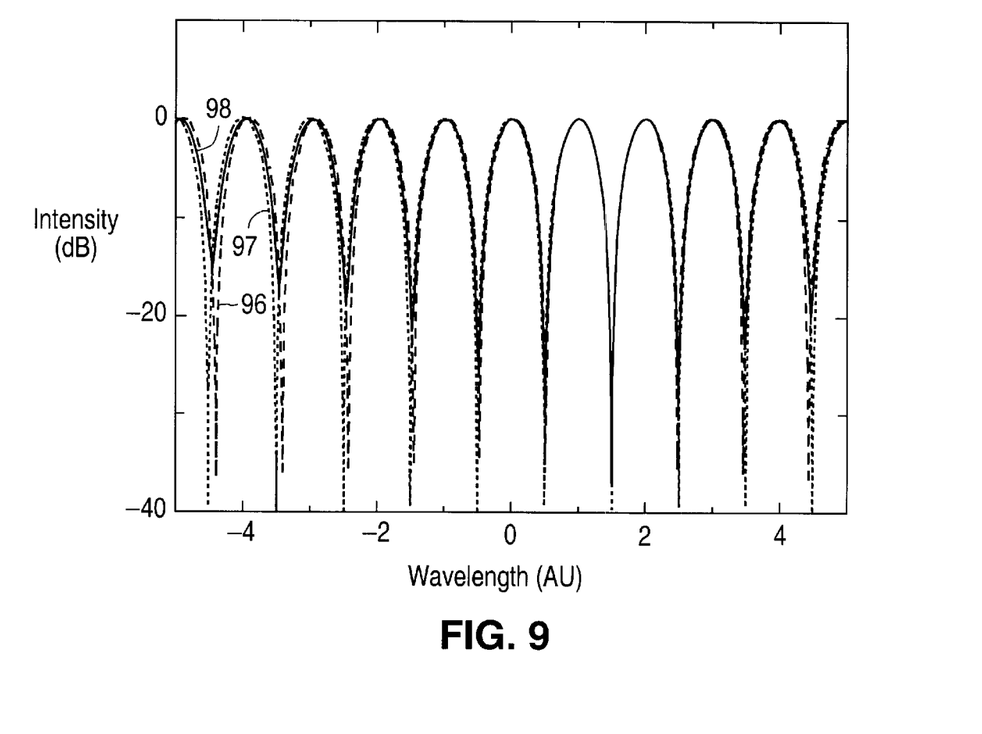
FIG. 9 illustrates the output spectra when a polarized light is applied at an input terminal and the output spectrum when an unpolarized light is applied at the input terminal, all with elastic twisting of the couplers.

FIG. 9 illustrates the output spectra when polarized lights are applied at the input terminal and the output spectrum when an unpolarized light is applied at the input terminal, all with elastic twisting of the couplers. Polarized spectrum 96 (shown in dashed line) shows the actual output spectrum (in logarithmic scale) when an x-polarized light is applied at input terminal 81 or 82. Similarly, polarized spectrum 97 (shown in dotted line) shows the actual output spectrum when a y-polarized light is applied at input terminal 81 or 82. Unpolarized spectrum 98 (shown in solid line) shows the output spectrum when an unpolarized light is applied at input terminal 81 or 82. Unpolarized spectrum 98 is the average of polarized spectra 96 and 97.

Two important parameters for a MWDM are: 1) the precise passband spacing, which could be different before and after the twisting process; and 2) the actual position of the low PDL peaks in the broad wavelength range. The low PDL peaks are the part of the modulation envelope having usable wavelengths of predefined values. In general, two peaks having an amplitude difference of less than 1% will both have a low PDL.

In accordance with the present invention, the fusion process is stopped before the coupler is twisted for polarization cancellation. In one embodiment, the twisted coupler is returned to its original axial position if the passband spacing is different from a predetermined passband spacing or the low PDL peaks position is different from a desired wavelength range. The coupler is then re-heated and stretched by a pre-determined amount and twisted to reach the desired channel spacing and low PDL peaks position. In an alternative embodiment, the coupler is re-heated and re-twisted without further stretching. The process of returning the twisted coupler to its original axial position, re-heating and re-twisting is repeated until the desired parameters are met. In general, a total of two to five repeats are sufficient.

In one embodiment, the re-heating, re-stretching and re-twisting adjustment process is applied when the coupler is twisted. For example, if the passband spacing is different from a predetermined passband spacing or the low PDL peaks position is different from a desired wavelength range after the initial heating-stretching-twisting process, without returning to its original axial position, the twisted coupler is re-heated and re-twisted, with or without additional stretching. It is noted that the adjustment to a twisted coupler should be slight because the insertion loss of the coupler tends to increase when the coupler is twisted and the fusion process will change the uniform structure at the coupling region.

In another embodiment, after the desired channel spacing and polarization cancellation are reached, a slight adjustment to the tension of the coupler is used to set the desired wavelength positions of the MWDM. The tension of the coupler may be adjusted by stretching or releasing the coupler by, for example, moving the fiber holding chucks on a fusion machine.

Figure 10:
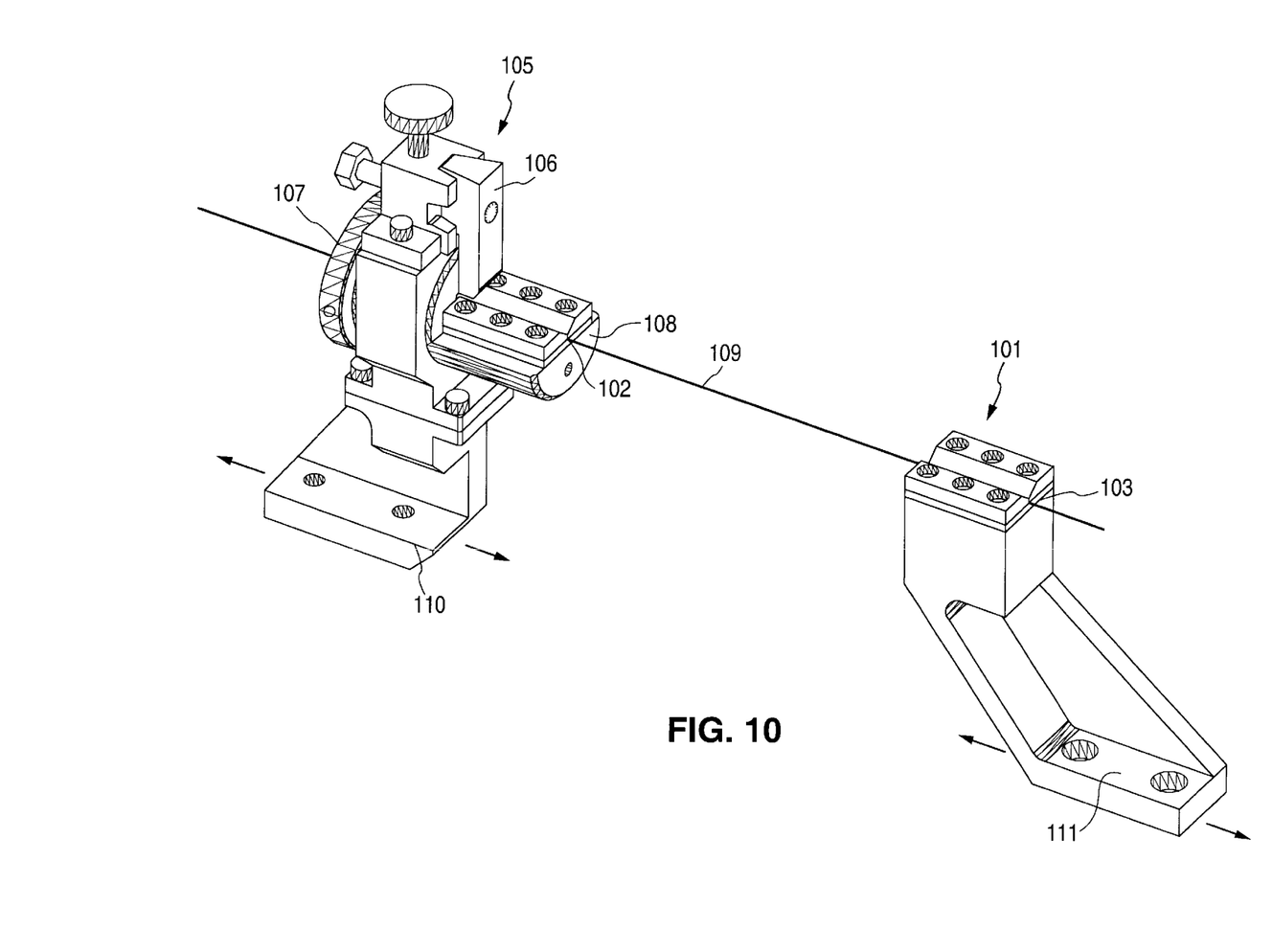
FIG. 10 illustrates a fiber twisting device.

FIG. 10 illustrates a fusion machine for implementing elastic twisting. Fusion machine 100 includes a fiber twisting device 105 having a first chuck 108, a latch 106 and a thumbwheel 107, a second chuck 101, and a heating device (not shown). Securing surfaces 102 and 103 of chucks 108 and 101, respectively, are positioned on the same plane during the heating and pulling process so that fibers 109 are held in a horizontal position. Base 110 of fiber twisting device 105 and base 111 of second chuck 101 sit on sliders so the distance between first chuck 108 and second chuck 101 may be adjusted. Latch 106 is locked in a vertical position, securing first chuck 108 so that the securing surface of first chuck 108 is in a horizontal position during the heating and the pulling process. A heating device heats fibers 109. During the heating process, fibers 109 are stretched to a predetermined length by adjusting the distance between first chuck 108 and second chuck 101. In general, the length of the heating time depends on the pulling speed. After the predetermined length is obtained, latch 106 is released to allow first chuck 108 to rotate when thumbwheel 107 is turned. In one embodiment, latch 106 is rotated 90°. After fibers 109 have been cooled for, for example, ten seconds, chuck 108 is rotated and continues to rotate, twisting fibers 109, until a desired polarization curve is obtained, e.g., by observing a spectrum analyzer. In the alternative, chuck 101 may be replaced by twisting device 105.

Fusion machine 100 has the advantages of having the capability to twist the fibers after the fusion process. Twisting device 105 replaces at least one of the chucks in the conventional device, which remain stationary at all times. By allowing at least one chuck to turn, the fibers may be twisted after the fusion process.

Figure 11:
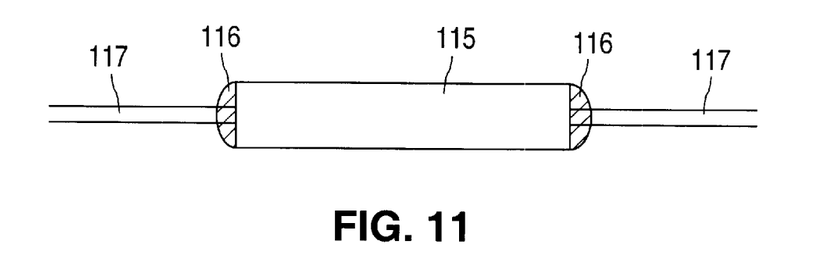
FIG. 11 illustrates a hermetic seal for a coupler.

A problem associated with the couplers is wavelength drifting caused by moisture at the surface of the coupler. FIG. 11 illustrates a hermetically sealed coupler, according to the present invention. A coupler 117 is hermetically sealed using technologies well known in the art such as fiber metalization and soldering process, now widely used in laser diode technology. In one embodiment, coupler 117 is hermetically sealed into a chamber. The chamber is a rigid case, e.g. a metal case 115 made of materials such as, but not limited to, stainless steel, that is properly surface-prepared for soldering. Similarly, coupler 117 has a portion that is surface-metalized for soldering to the chamber. The interface between coupler 117 and metal case 115 is then sealed, for example, by a solder 116. Solder 116 is, for example, a tin/gold alloy, a lead/tin/silver alloy, an indium/tin alloy, or any solderable alloy. The sealing process is preferably conducted in a moisture-free environment, such as an environment filled with dry nitrogen or argon, so that the passband wavelength of the MWDM is not affected by any moisture in the chamber.

By providing a hermetic seal for coupler 117, coupler 117 is protected from the moisture on the surface of coupler 117. Thus, wavelength drift associated with moisture is eliminated, providing a stable device.

The interface between coupler 117 and metal case 115 can also be sealed using non-hermetic seals such as organic seals. However, organic seals have high moisture permeability and do not stand up to harsh environments having high temperature or high humidity.

During the device packaging and annealing processes, the need to adjust the passband wavelength for a narrow band MWDM sometimes arises. In one embodiment, the coupling region of the coupler is exposed to ultraviolet (UV) radiation. The UV radiation changes the refraction index of the coupling region, thereby changing the MWDM passband wavelength of the coupler. In one embodiment, the UV radiation exposure is performed before sealing the fused fiber coupler in the chamber package, so the UV radiation directly exposes the coupler. In another embodiment, the passband wavelength adjustment is performed after the coupler is sealed in the chamber package. In this embodiment, the packaging case has a portion that is transparent to UV radiation.

The wavelength peaks and passbands also shift due to the temperature dependence of the refractive index of the fiber ($\sim 6 \times 10^{-6}/°$ C.). For example, experiments have shown that wavelength peaks change with temperature at a rate of approximately 0.007 nm/° C. for light at wavelengths around 1550 nm. Thus, for a 100° C. change in temperature., the wavelength will shift by about 0.7 nm. Such a temperature-induced wavelength shift is significant for DWDM applications due to the small separation between channels. For example, with a 16-channel DWDM, the channel spacing might only be ~0.8 nm, and thus a potential temperature-induced 0.7 nm wavelength shift can pose significant problems.

In order to minimize this effect, a passive thermal compensation (PTC) technique similar to, but much simpler than, that disclosed in U.S. Pat. No. 6,081,641 (hereinafter the and incorporated by reference herein in its entirety, can be used,. Unlike the '641 patent, which employs a composite substrate and negative thermal expansion coefficients, the present invention utilizes conventional substrates having, positive thermal expansion coefficient which are simpler to manufacture. The following example illustrates the principle in general.

In the '641 patent, a coupler is fused and elongated until reaching an optimum phase match (OPM) condition. The passband wavelength decreases when a coupler is stretched to increase the internal tension. However, for couplers having OPM, the thermal coefficient of the passband wavelength is negative and a composite substrate with negative thermal expansion coefficient is used to minimize temperature-induced wavelength shifts.

In contrast to the '641 patent, the coupler is heated, in accordance with the present invention. The passband wavelength of a coupler increases in direct response to an increase in temperature. Therefore, no composite substrate structure is needed. In one embodiment, the coupler is mounted on a substrate in a similar manner as that shown in FIG. 5 and described in detail later. The substrate has a larger thermal expansion coefficient than the thermal expansion coefficient of silica fiber to adjust the tension of the coupler, thus counteracting the intrinsic thermal drift of the coupler. Silica fiber has a relatively. small thermal expansion coefficient as compared to most other materials. The substrate is made of materials such as, but not limited to, ceramic glass and metal alloys. In one embodiment, the substrate has a thermal expansion coefficient in the range of approximately 2.0 in/in/° C. to approximately 10 in/in/° C. in a temperature range of approximately −40° C. to approximately 100° C.

By using PTC with the MWDM of the present invention, effects of temperature-induced wavelength shifts in DWDM can be minimized to maintain desired optical path length differences and passband wavelengths. Consequently, channel spacings of less than 10 nm are possible. In one embodiment, the channel spacing is less than 70 nm at wavelengths in the range of approximately 700 nm to approximately 2000 nm.

Figure 12:
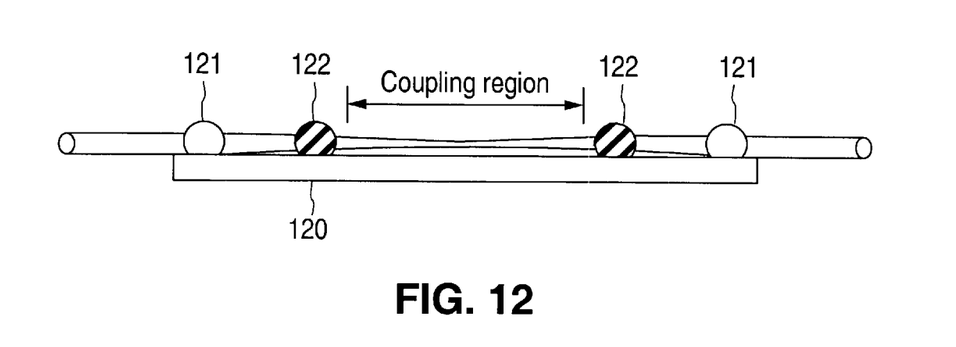
FIG. 12 illustrates a fiber coupler mounting scheme for improved mechanical shock protection.

Another problem associated with the couplers is vulnerability to mechanical shocks and vibrations. When a fused fiber coupler has a longer pull length, its dimension at the coupling region becomes smaller, which causes the coupler to be more vulnerable to mechanical shocks and vibrations. FIG. 12 illustrates a coupler mounting scheme for improved mechanical shock protection. Referring back to FIG. 5, the coupler is mounted on a rigid substrate 50 (quartz or PTC substrate) by rigid adhesives (not shown) to maintain the position and tension of the coupler. Typically, the rigid adhesive is placed at a location away from the heated region because fibers tend to be very fragile and easily cracked or broken during temperature cycles. The cracks or breakage occur due to the larger thermal expansion of the rigid adhesive in comparison to the fibers. Hence, the rigid adhesive is typically placed near the end of the substrate where the fibers have not been heated and fused by the torch.

In one embodiment, soft adhesives are used in conjunction with the rigid adhesives to improve mechanical shock protection. As shown in FIG. 12, rigid adhesives 121 bond the unheated fiber portions to substrate 120 at locations near each end of substrate 120. Each soft adhesive 122 bonds a heated fiber portion to substrate 120 at a location between rigid adhesive 121 and the coupling region of the coupler. Soft adhesives 122 are made of materials having a hardness of, e.g., shore A60, such as silicone, soft UV adhesive, or any soft material. The additional bonding by soft adhesives 122 reduces the total moving (or vibrating) length of the coupler. The reduced coupler movement in turn reduces breakage caused by mechanical shocks or vibrations. Soft adhesives 122 do not damage the heated fiber during a temperature cycle, mechanical shocks, or vibrations because of the flexibility associated with a soft adhesive material. In one embodiment, soft adhesives 122 are placed in locations as close to the center of the heated portion as possible. However, soft adhesives 122 should not be placed in the coupling region where the light starts to expand into the fiber cladding of the coupler because the soft adhesive will scatter the light in the coupling region. In general, the position of soft adhesive 122 for each pull length is determined experimentally.

Figure 13A:
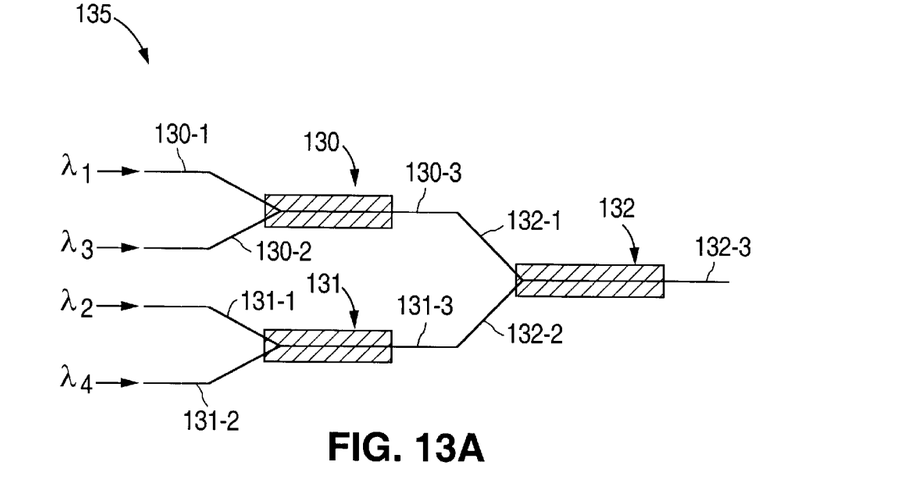
FIG. 13A illustrates cascading MWDMs in a plurality of stages.
Figure 13B:
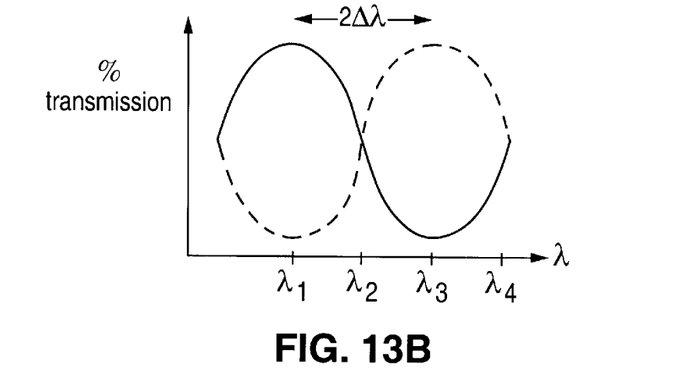
FIGS. 13B–13D illustrate various output spectrums at the two stages in FIG. 14A.
Figure 13C:
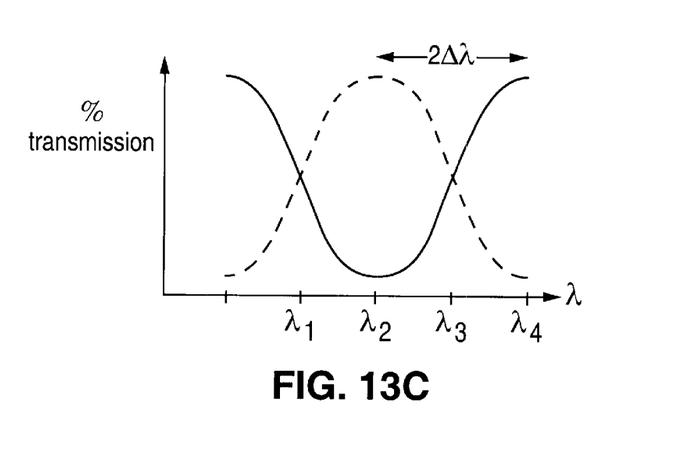
Figure 13D:
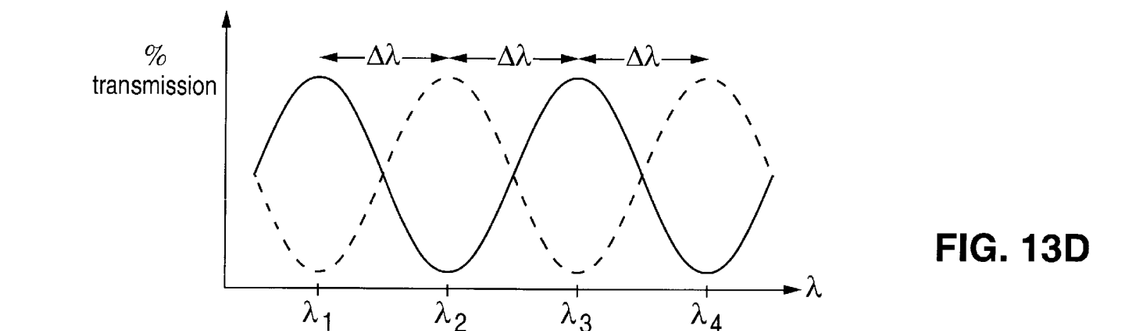

For a given usable bandwidth, the number of channels propagating through a single fiber can be increased by cascading MWDMs, as shown in FIG. 13A, and disclosed in commonly-owned U.S. Pat. No. 5,809,190, incorporated by reference above. In FIG. 13A, a combiner 135, formed by cascading three MWDMs into two stages, couples signals at four wavelengths onto a single line. Signals at wavelengths $\lambda_1$ and $\lambda_3$ entering terminals 130-1 and 130-2, respectively, of MWDM 130 in the first stage are coupled and transmitted to exit terminal 130-3 of MWDM 130 with a channel separation of $2\Delta\lambda$, as shown in FIG. 13B. Similarly, signals at wavelengths $\lambda_2$ and $\lambda_4$ entering terminals 131-1 and 131-2, respectively, of MWDM 131 in the first stage are coupled and transmitted to exit terminal 131-3 of MWDM 131 with a channel separation of $2\Delta\lambda$ as shown in FIG. 13C. The output signals within the usable bandwidth from terminals 130-3 and 131-3, shown in FIGS. 13B and 13C, respectively, then enter terminals 132-1 and 132-2 of MWDM 132 in the second stage. The four signals are coupled by MWDM 132, with an output spectrum shown in FIG. 13D, and exit at terminal 132-3. The channel separation is now $\Delta\lambda$ between all channels within the usable bandwidth. The multiplexed signal can then be demultiplexed to separate the signals into four separate channels at a receiving device. For example, the combiner 135 can be reversed to form a splitter, such that the signal represented by FIG. 13D enters terminal 132-3 of MWDM 132 and is decoupled into four separate signals exiting at terminals 130-1, 130-2, 131-1 and 131-2.

Although only two cascaded stages are shown, more channels can be coupled by cascading additional stages of MWDMs, which progressively decreases the channel spacing. A dense wavelength division multiplexer (DWDM) may be created by such a cascade of multiple MWDMs. DWDM seeks to increase data transmission capability by coupling additional discrete wavelengths or channels onto a single fiber. Fused-fiber DWDMs may couple, for example, 8, 16, or even 32 discrete communication channels onto a single optic fiber.

DWDMs made by BTF technology show the lowest insertion loss as compared to DWDMs made by other technologies. Hence, the present invention may be used in a pump combiner for, e.g., an erbium doped amplifier. Conventionally, to increase the output power or to increase the gain of the erbium doped amplifier, higher pump power is required. However, the pump power is limited by 200 mW of the current technology due to the saturated power of the semiconductors, and the largest possible surface of laser diodes to couple light into single mode fibers. By employing the couplers of the present invention, a very low insertion loss device is obtained. In one embodiment, the fused-fiber coupler has an insertion loss of less than 0.6 dB for wavelengths to be combined. In another embodiment, the wavelengths to be combined by the pump combiner is between 900 nm to 1600 nm. The couplers can be used to combine, for example, 2, 4, or 8 different wavelengths of pump to increase the total pump power and thus, a higher gain.

Figure 14:
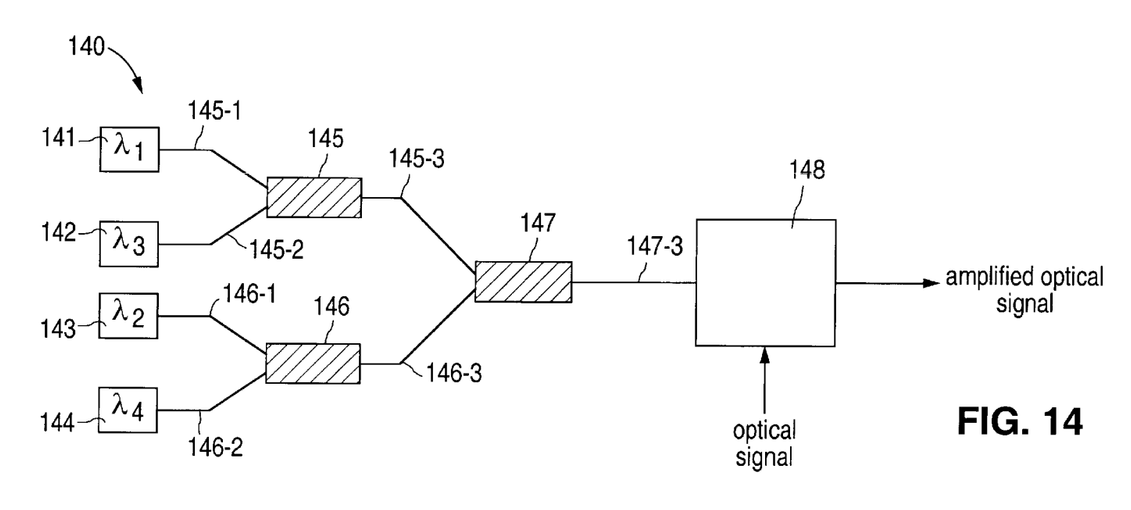
FIG. 14 shows a pump combiner utilizing the coupler of the present invention.

FIG. 14 shows a pump combiner 140 utilizing the coupler of the present invention. Signals at wavelengths $\lambda_1$ and $\lambda_3$ from pump laser diode 141 and pump laser diode 142, respectively, enter terminals 145-1 and 145-2, respectively, of MWDM 145. The signals at wavelengths $\lambda_1$ and $\lambda_3$ are coupled and transmitted to exit terminal 145-3 of MWDM 145. Similarly, signals at wavelengths $\lambda_2$ and $\lambda_4$ from pump laser diode 143 and pump laser diode 144, respectively, enter terminals 146-1 and 146-2, respectively, of MWDM 146. The signals at wavelengths $\lambda_2$ and $\lambda_4$ are coupled and transmitted to exit terminal 146-3 of MWDM 146. The output signals within the usable bandwidth from terminals 145-3 and 146-3 then enter MWDM 147, coupled, and exit at terminal 147-3. The combined signal from terminal 147-3 is pumped into an optical amplifier 148, from which an amplified optical signal is produced.

The above-described embodiments of the present invention are merely meant to be illustrative and not limiting. It will thus be obvious to those skilled in the art that various changes and modifications may be made without departing from this invention in its broader aspects. For example, although specific techniques were discussed for obtaining hermetic seals, any suitable method can be used in accordance with this invention. Therefore, the appended claims encompass all such changes and modifications as fall within the true spirit and scope of this invention.

We claim:

1. A fused-fiber multi-window wavelength division multiplexer (MWDM) device, comprising:
   a fused-fiber coupler having fused-fiber portion; and
   a chamber hermetically sealing said fused fiber portion, wherein said chamber comprises a rigid case, said rigid case being surface-prepared for soldering.

2. The device of claim 1, wherein said fused-fiber coupler comprises a portion which is surface metalized for soldering to said chamber.

3. The device of claim 1, further comprising solder at an interface of said chamber and said fused-fiber coupler.

4. The device of claim 1, wherein said fused-fiber portion of said MWDM is twisted more than two turns.

5. The device of claim 1, wherein said fused-fiber portion of said MWDM is twisted to obtain polarization cancellation for said fused-fiber coupler.

6. A fused-fiber multi-window wavelength division multiplexer (MWDM) device, comprising:
   a fused-fiber coupler having fused-fiber portion;
   a chamber hermetically sealing said,fused fiber portion; and
   a substrate securing -said fused-fiber coupler.

7. The device of claim 6, wherein said substrate has a thermal expansion coefficient greater than the thermal expansion coefficient of silica fiber.

8. The device of claim 6, wherein said substrate has thermal expansion coefficient in the range of approximately 2.0 in/in/° C. to approximately 10 in/in/° C. in a temperature range of approximately −40° C. to approximately 100° C.

9. The device of claim 6, further comprising:
   a rigid adhesive bonding said fused-fiber coupler to said substrate; and
   a soft adhesive bonding said fused-fiber coupler to said substrate, wherein said soft adhesive is positioned between said rigid adhesive and a coupling region of said fused-fiber coupler.

10. The device of claim 6, wherein said device has a channel spacing of less than 70 nm at a wavelength in the range of approximately 700 mm to approximately 2000 nm.

11. A fused-fiber multi-window wavelength division multiplexer (MWDM) device, comprising:
   a fused-fiber coupler having a fused-fiber portion, wherein said fused-fiber portion is twisted more than two turns; and
   a substrate securing said fused-fiber coupler, said substrate having a thermal expansion coefficient greater than the thermal expansion coefficient of silica fiber.

12. A fused-fiber multi-window wavelength division multiplexer (MWDM) device, comprising:
   a fused-fiber coupler having a fused-fiber portion, wherein said fused-fiber portion is twisted more than two turns;
   substrate securing said fused-fiber coupler;
   a rigid adhesive bonding said fused-fiber coupler to said substrate; and
   a soft adhesive bonding said fused-fiber coupler to said substrate, wherein said soft adhesive is positioned between said rigid adhesive and a coupling region of said fused-fiber coupler.

13. A dense wavelength division multiplexer (DWDM) device, comprising:
   a first multi-window WDM (MWDM), comprising:
      a fused-fiber coupler having a fused-fiber portion; and
      a chamber hermetically sealing said fused-fiber portion;
   a second MWDM similar to said first MWDM connected to a first output terminal of said fused-fiber coupler of said first MWDM; and
   a third MWDM similar to said first MWDM connected to a second output terminal of said fused-fiber coupler of said first MWDM, wherein said second and third MWDMs form a cascaded stage of MWDMs.

14. The device of claim 13, further comprising similarly cascaded stages of MWDMs to form a 1×N dense WDM device, wherein N is greater than 2.

15. The device of claim 13, wherein said fused-fiber portion of said DWDM is twisted to obtain polarization cancellation.

16. The device of claim 13, wherein said fused-fiber portion of said DWDM is twisted more than two turns.

17. A dense wavelength division multiplexer (DWDM) device, comprising:
   a first multi-window WDM (MWDM), comprising a fused-fiber coupler having a fused-fiber portion, said fused-fiber portion being twisted more than two turns;
   a second MWDM similar to said first MWDM connected to a first output terminal of said fused-fiber coupler of said first MWDM; and
   a third MWDM similar to said first MWDM connected to a second output terminal of said fused-fiber coupler of said first MWDM, wherein said second and third MWDMs form a cascaded stage of MWDMs.

18. The device of claim 17, further comprising similarly cascaded stages of MWDMs to form a 1×N dense WDM device, wherein N is greater than 2.

19. The device of claim 17, further comprising twisting said fused-fiber portion to obtain polarization cancellation.

20. A method of making a fused-fiber multi-window wavelength division multiplexer (MWDM) device, comprising:

hermetically sealing a fused-fiber coupler in a chamber; and securing said fused-fiber coupler in a substrate for passive thermal compensation.

21. The method of claim 20, wherein said substrate has a larger thermal expansion coefficient than the thermal expansion coefficient for silica fiber.

22. The method of claim 21, wherein said thermal expansion coefficient of said substrate is in the range of approximately 2.0 in/in/° C. to approximate 10 in/in/° C.

23. A method of making a fused-fiber multi-window wavelength division multiplexer (MWDM) device, comprising:

hermetically sealing a fused-fiber coupler in a chamber; and securing said fused-fiber coupler to a substrate comprising:

bonding said fused-fiber coupler to said substrate using a rigid adhesive; and bonding said fused fiber coupler to said substrate using a soft adhesive, said soft adhesive being located at a position between said rigid adhesive and a coupling region of said fused-fiber coupler.

24. A method of making a fused-fiber multi-window wavelength division multiplexer (MWDM) device, comprising:

hermetically sealing a fused-fiber coupler in a chamber; and adjusting a passband wavelength of said fused-fiber coupler.

25. The method of claim 24, wherein said adjusting the passband wavelength of said fused-fiber coupler comprises exposing said fused-fiber coupler to UV radiation, said UV radiation changes the refraction index of said coupling region of said fused-fiber coupler, thereby changing the passband wavelength of said fused-fiber coupler.

26. The method of claim 25, wherein said exposing said fused fiber coupler to UV radiation is performed prior to said hermetically sealing said fused-fiber coupler.

27. The method of claim 27, wherein said exposing said fused fiber coupler to UV radiation is performed subsequent to said hermetically sealing said fused-fiber coupler.

28. The method of claim 27, wherein said substrate securing said fused-fiber coupler has a region transparent to said UV radiation.

29. A method of making a fused-fiber multi-window wavelength division multiplexer (MWDM) device, comprising:

hermetically sealing a fused-fiber coupler in a chamber; and adjusting a tension of said fused-fiber coupler subsequent to obtaining a predetermined passband spacing and a predetermined low polarization-dependent low (PDL) peaks position.

30. A method of making a fused-fiber multi-window wavelength division multiplexer (MWDM) device, comprising:

twisting a fused-fiber coupler more than two turns;

heating and stretching said fused-fiber coupler by a first amount;

twisting said fused-fiber coupler subsequent to termination of said heating; and returning said twisted fused-fiber coupler to an original axial position of said fused-fiber coupler when a passband spacing of said twisted fused-fiber coupler is different from a predetermined passband spacing.

31. The method of claim 30, further comprising:

re-heating said fused-fiber coupler; and re-twisting said fused-fiber coupler subsequent to termination of said re-heating.

32. The method of claim 30, further comprising:

re-heating said fused-fiber coupler;

re-stretching s id fused-fiber coupler by a predetermined amount; and re-twisting said fused-fiber coupler subsequent to termination of said re-heating.

33. A method of making a fused-fiber multi-window wavelength division multiplexer (MWDM) device, comprising:

twisting a fused-fiber coupler more than two turns;

heating and stretching said fused-fiber coupler by a first amount;

twisting said fused-fiber coupler subsequent to termination of said heating; and returning said twisted fused-fiber coupler to an original axial position of said fused-fiber coupler when a low PDL peaks position of said twisted fused-fiber coupler differs from predetermined wavelength range.

34. The method of claim 33, further comprising:

re-heating said fused-fiber coupler; and re-twisting s d fused-fiber coupler subsequent to termination of said re-heating.

35. The method of claim 33, further comprising:

re-heating sad fused-fiber coupler;

re-stretching sad fused-fiber coupler by a predetermined amount; and re-twisting sail fused-fiber coupler subsequent to termination of said re-heating.

36. A method of making a fused-fiber multi-window wavelength division multiplexer (MWDM) device comprising:

twisting a fused-fiber coupler more than two turns;

heating and stretching said fused-fiber coupler by a first amount;

twisting said fused-fiber coupler subsequent to termination of said heating;

re-heating said fused-fiber coupler when a passband spacing of said twisted fused-fiber coupler is different from a predetermined passband spacing; and re-twisting said fused-fiber coupler subsequent to terminating said re-heating.

37. A method of making a fused-fiber multi-window wavelength division multiplexer (MWDM) device, comprising:

twisting a fused-fiber coupler more than two turns;

heating and stretching said fused-fiber coupler by a first amount;

twisting said fused-fiber coupler subsequent to termination of said heating;

re-heating said fused-fiber coupler when a passband spacing of said twisted fused-fiber coupler is different from a predetermined passband spacing;

re-stretching said fused-fiber coupler by a predetermined amount; and re-twisting said fused-fiber coupler subsequent to termination of said re-heating.

38. A method of making a fused-fiber multi-window wavelength division multiplexer (MWDM) device, comprising:

twisting a fused-fiber coupler more than two turns;

heating and stretching said fused-fiber coupler by a first amount;

twisting said fused-fiber coupler subsequent to termination of said heating;

re-heating said fused-fiber coupler when a low PDL peaks position of said twisted fused-fiber coupler differs from a predetermined wavelength rang; and re-twisting said fused-fiber coupler subsequent to termination of said re-heating.

39. A method of making a fused-fiber multi-window wavelength division multiplexer (MWDM) device, comprising:

twisting a fused-fiber coupler more than two turns;

heating and stretching said fused-fiber coupler by a first amount;

twisting said fused-fiber coupler subsequent to termination of said heating;

re-heating said fused-fiber coupler when a low PDL peaks position of said twisted fused-fiber coupler differs from a predetermined wavelength rang; and re-twisting said fused-fiber coupler subsequent to termination of said re-heating.

40. A method of making a fused-fiber multi-window wavelength division multiplexer (MWDM) device, comprising:

twisting a fused-fiber coupler more than two turns; and securing said fused-fiber coupler in a substrate for passive thermal compensation.

41. The method of claim 20, further comprising securing said fused-fiber coupler to a substrate comprising:

bonding said fused-fiber coupler to said substrate using a rigid adhesive; and bonding said fused fiber coupler to said substrate using a soft adhesive, said soft adhesive being located at a position between said rigid adhesive and a coupling region of said fused-fiber coupler.

42. A method of making a fused-fiber multi-window wavelength division multiplexer (MWDM) device, comprising:

twisting a fused-fiber coupler more than two turns; and adjusting a passband wavelength of said fused-fiber coupler by exposing said fused-fiber coupler to UV radiation.

43. A method of making a fused-fiber multi-window wavelength division multiplexer (MWDM) device, comprising:

twisting a fused-fiber coupler more than two turns; and adjusting a tension of said fused-fiber coupler subsequent to obtaining a predetermined passband spacing and a predetermined low PDL peaks position.

44. A pump combiner, comprising:

a fused-fiber multi-window wavelength division multiplexer (MWDM) device, comprising:

a fused-fiber coupler having a fused-fiber portion; and a chamber hermetically sealing said fused-fiber portion.

45. The pump combiner of claim 44, wherein said fused-fiber portion is twisted more than two turns.

46. The pump combiner of claim 44, wherein said fused-fiber coupler has an insertion loss of less than 0.6 dB for wavelengths to be combined.

47. The pump combiner of claim 44, wherein said pump combiner combines wavelengths in the range of approximately 900 nm to approximately 1600 nm.

48. A pump combiner, comprising:

a fused-fiber multi-window wavelength division multiplexer (MWDM) device, said fused-fiber MWDM comprises a fused-fiber coupler having a fused-fiber portion wherein said fused-fiber portion is twisted more than two turns.

49. The pump combiner of claim 48, wherein said fused-fiber coupler has an insertion loss of less than 0.6 dB for wavelengths to be combined.

50. The pump combiner of claim 48, wherein said pump combiner combines wavelengths in the range of approximately 900 nm to approximately 1600 nm.

51. A multi-wavelength pump combiner comprising at least two multi-window WDMs (MWDMs), wherein an output terminal of a first MWDM is connected to a second MWDM, said second-MWDM forming a cascaded stage of MWDMs, said first MWDM comprises a fused-fiber coupler having a fused-fiber portion and a chamber hermetically sealing said fused-fiber portion, and said second MWDM is similar to said first MWDM.

52. The device of claim 51, wherein said fused fiber portion of said DWDM is twisted more than two turns.

53. A multi-wavelength pump combiner comprising at least two multi-window WDMs (MWDMs), wherein an output terminal of a first MWDM is connected to a second MWDM, said second MWDM forming a cascaded stage of MWDMs, said first MWDM comprises a fused-fiber coupler having a fused-fiber portion, said fused-fiber portion is twisted more than two turns and is similar to said first MWDM.

* * * * *